(12) United States Patent
Kishida

(10) Patent No.: US 10,352,410 B2
(45) Date of Patent: Jul. 16, 2019

(54) TOROIDAL CONTINUOUSLY VARIABLE TRANSMISSION

(71) Applicant: NSK LTD., Tokyo (JP)

(72) Inventor: Hirotaka Kishida, Fujisawa (JP)

(73) Assignee: NSK LTD., Tokyo (JP)

( * ) Notice: Subject to any disclaimer, the term of this patent is extended or adjusted under 35 U.S.C. 154(b) by 444 days.

(21) Appl. No.: 15/119,008

(22) PCT Filed: Jan. 29, 2015

(86) PCT No.: PCT/JP2015/052594
§ 371 (c)(1),
(2) Date: Aug. 15, 2016

(87) PCT Pub. No.: WO2015/122291
PCT Pub. Date: Aug. 20, 2015

(65) Prior Publication Data
US 2017/0045123 A1 Feb. 16, 2017

(30) Foreign Application Priority Data

Feb. 17, 2014 (JP) ................... 2014-027123

(51) Int. Cl.
*F16H 15/38* (2006.01)
*F16H 57/021* (2012.01)

(52) U.S. Cl.
CPC ........... *F16H 15/38* (2013.01); *F16H 57/021* (2013.01); *F16H 2057/0216* (2013.01)

(58) Field of Classification Search
CPC . F16H 15/38; F16H 57/021; F16H 2057/0216
See application file for complete search history.

(56) References Cited

U.S. PATENT DOCUMENTS 5,368,529 A 11/1994 Machida
6,117,042 A * 9/2000 Wafzig ................... F16H 15/38
476/40

(Continued)

FOREIGN PATENT DOCUMENTS

DE 19753372 A1 6/1999
JP 6-14604 U 2/1994

(Continued)

OTHER PUBLICATIONS

International Search Report dated Apr. 7, 2015 issued by International Searching Authority in counterpart International Patent Application No. PCT/JP2015/052594 (PCT/ISA/210).

(Continued)

*Primary Examiner* — David M Fenstermacher
(74) *Attorney, Agent, or Firm* — Sughrue Mion, PLLC

(57) ABSTRACT

A toroidal continuously variable transmission include a pair of disks which is provided rotatably and concentrically with each other in a state where inner surfaces of respective disks are opposed to each other and a power roller held between the disks opposing to each other. One of the disks is supported on a shaft. The other of the disks is rotatably supported, via a first bearing, on a hollow shaft into which the shaft is inserted and which is non-rotatably supported by a support member. The shaft is rotatably supported on the hollow shaft via a second bearing.

3 Claims, 5 Drawing Sheets

(56) References Cited

U.S. PATENT DOCUMENTS

| | | | |
|---|---|---|---|
| 2003/0176254 A1* | 9/2003 | Elser | F16H 15/38 |
| | | | 476/40 |
| 2004/0102285 A1* | 5/2004 | Kato | F16H 15/38 |
| | | | 476/46 |
| 2004/0204283 A1* | 10/2004 | Inoue | F16H 37/086 |
| | | | 476/46 |
| 2005/0153814 A1* | 7/2005 | Perry | F16H 15/38 |
| | | | 476/40 |
| 2005/0197227 A1 | 9/2005 | Imanishi et al. | |
| 2013/0045831 A1* | 2/2013 | Greenwood | F16H 15/38 |
| | | | 476/40 |

FOREIGN PATENT DOCUMENTS

| | | |
|---|---|---|
| JP | 06147284 A | 5/1994 |
| JP | 2001-116097 A | 4/2001 |
| JP | 2001-165267 A | 6/2001 |
| WO | 2006/003887 A1 | 4/2006 |

OTHER PUBLICATIONS

Written Opinion dated Apr. 7, 2015 issued by International Searching Authority in counterpart International Patent Application No. PCT/JP2015/052594 (PCT/ISA/237).
Communication dated May 22, 2017, issued by the European Patent Office in counterpart European Patent Application No. 15748931.1.
Communication dated Jun. 27, 2018, issued by the European Patent Office in counterpart European Application No. 15 748 931.1.
Office Action dated Sep. 19, 2017 by the Japanese Patent Office in counterpart Japanese Patent Application No. 2014-027123.

* cited by examiner

TOROIDAL CONTINUOUSLY VARIABLE TRANSMISSION

FIELD

The present invention relates to a toroidal continuously variable transmission which can be used as a transmission for automobiles or various industrial machines.

RELATED ART

For example, a double cavity-type toroidal continuously variable transmission used as a transmission for an automobile is configured as shown in FIGS. 3 and 4. As shown in FIG. 3, an input shaft 1 is rotatably supported inside a casing 50, and two input-side disks 2, 2 and two output-side disks 3, 3 are attached to an outer periphery of the input shaft 1. Further, an output gear 4 is rotatably supported on an outer periphery of an intermediated portion of the input shaft 1. The output-side disks 3, 3 are connected, by a spline coupling, to cylindrical flange portions 4a, 4a provided at a central portion of the output gear 4.

The input shaft 1 is rotationally driven by a drive shaft 22 via a loading cam-type pressing device 12 which is provided between the input-side disk 2 located on the left side in FIG. 3 and a cam plate (loading cam) 7. Further, the output gear 4 is supported inside the casing 50 via a partition wall 13 which is configured by coupling two members, in this way, the output gear 4 can be rotated about an axis O of the input shaft 1 but is prevented from being displaced in the direction of the axis O.

The output-side disks 3, 3 are rotatably supported about the axis O of the input shaft 1 by needle bearings 5, 5 interposed between the output-side disks 3, 3 and the input shaft 1. Also, the input-side disk 2 located on the left side in FIG. 3 is supported on the input shaft 1 via a ball spline 6 and the input-side disk 2 located on the right side in FIG. 3 is spline-coupled to the input shaft 1, so that these input-side disks 2 are rotated together with the input shaft 1. Further, a power roller 11 (see FIG. 4) is rotatably held between inner surfaces concave surfaces; also referred to as traction surfaces) 2a, 2a of the input-side disks 2, 2 and inner surfaces (concave surfaces; also referred to as traction surfaces) 3a, 3a of the output-side disks 3, 3.

A stepped portion 2b is provided on an inner peripheral surface 2c of the input-side disk 2 located on the right side in FIG. 3. A stepped portion 1b provided on an outer peripheral surface 1a of the input shaft 1 is abutted against the stepped portion 2b, and a rear surface (right surface in FIG. 3) of the input-side disk 2 is abutted against a loading nut 9 which is screwed to a threaded portion formed on the outer peripheral surface of the input shaft 1. In this way, the displacement of the input-side disk 2 in the direction of the axis O relative to the input shaft 1 is substantially prevented. Further, a disc spring 8 is provided between the cam plate 7 and a collar portion 1d of the input shaft 1. The disc spring 8 exerts a pressing force (preload) to abutment portions between the concave surfaces 2a, 2a, 3a, 3a of respective disks 2, 2, 3, 3 and peripheral surfaces 11a, 11a of the power rollers 11, 11.

FIG. 4 is a sectional view taken along a line A-A shown in FIG. 3. As shown in FIG. 4, a pair of trunnions 15, 15 is provided inside the casing 50. The pair of trunnions 15, 15 is swung about a pair of pivot shafts 14, 14 located at positions twisted relative to the input shaft 1. Meanwhile, the input shaft 1 is not shown in FIG. 4. Each of the trunnions 15, 15 has a pair of bent wall portions 20, 20 at both ends in the longitudinal direction (vertical direction in FIG. 4) of a support plate portion 16. The pair of bent wall portions 20, 20 is formed in a state of being bent toward an inner surface side of the support plate portion 16. Then, a recessed pocket portion P for accommodating the power roller 11 is formed in each of the trunnions 15, 15 by the bent wall portions 20, 20. Further, the pivot shafts 14, 14 are respectively provided concentrically with each other on the outer surfaces of respective bent wall portions 20, 20.

A circular hole 21 is formed at a central portion of the support plate portion 16 and a base end portion (first shaft portion) 23a of a displacement shaft 23 is supported on the circular bole 21. Then, when respective trunnions 15, 15 are swung about respective pivot shafts 14, 14, inclination angles of the displacement shafts 23 supported on the central portions of respective trunnions 15, 15 are adjusted. Further, each power roller 11 is rotatably supported around a leading end portion (second shaft portion) 23b of the displacement shaft 23 protruding from the inner surfaces of respective trunnions 15, 15. Respective power rollers 11, 11 are held between respective input-side disks 2, 2 and respective output-side disks 3, 3. Meanwhile, the base end portions 23a and the leading end portions 23b of respective displacement shafts 23, 23 are eccentric to each other.

Further, the pivot shafts 14, 14 of respective trunnions 15, 15 are respectively supported so as to be swingable and displaceable axially (vertically in FIG. 4) relative to a pair of yokes 23A, 23B. Movement in a horizontal direction of the trunnions 15, 15 is restricted by respective yokes 23A, 23B. Each of the yokes 23A, 23B is formed into a rectangular shape by pressing or forging metal such as steel. Four circular support holes 18 are provided at four corners of respective yokes 23A, 23B. Each pivot shaft 14 provided at both end portions of the trunnion 15 is swingably supported on the support holes 18 via a radial needle bearing 30. Further, circular locking holes 19 are provided at central portions in a width direction (lateral direction in FIG. 3) of the yokes 23A, 23B. Inner peripheral surfaces of the locking holes 19 are cylindrical surfaces and spherical posts 64, 68 are fitted into the locking holes. That is, the upper yoke 23A is swingably supported by the spherical post 64 supported on the casing 50 via a fixing member 52, and the lower yoke 23B is swingably supported by the spherical post 68 and an upper cylinder body 61 of a drive cylinder (cylinder body) 31 to support the spherical post 68.

Meanwhile, respective displacement shafts 23, 23 provided in respective trunnions 15, 15 are placed at positions which are opposite to each other by 180° with respect to the input shaft 1. Further, the direction in which the leading end portions 23b of the respective displacement shafts 23, 23 are eccentric with respect to the base end portions 23a is the same direction (vertically opposite directions in FIG. 4) with respect to the rotation direction of both disks 2, 2, 3, 3. Further, the eccentric direction is a direction substantially perpendicular to an arrangement direction of the input shaft 1. Therefore, respective power rollers 11, 11 are supported so as to be slightly displaceable in the longitudinal direction of the input shaft 1. As a result, even when respective power rollers 11, 11 tend to be displaced in the axial direction of the input shaft 1 due to the elastic deformation or the like of respective constituent members based on a thrust load generated by the pressing device 12, an excessive force is not applied to respective constituent members and the displacement thereof is thus absorbed.

Further, between an outer surface of the power roller 11 and an inner surface of the support plate portion 16 of the trunnion 15, a thrust ball bearing (thrust bearing) 24 being a thrust rolling bearing and a thrust needle bearing 25 are provided in this order from the side of the outer surface of the power roller 11. Of these, the thrust ball bearing 24 allows the rotation of each power roller 11 while bearing a load applied to each power roller 11 in a thrust direction. Each thrust ball bearing 24 is configured by a plurality of balls (hereinafter, referred to as a rolling body) 26, 26, an annular retainer 27 for rollably holding respective rolling bodies 26, 26, and an annular outer ring 28. Further, an inner ring raceway of each thrust ball bearing 24 is formed at an outer surface (large end surface) of each power roller 11 and an outer ring raceway thereof is formed at an inner surface of each outer ring 28.

Further, the thrust needle bearing 25 is held between an inner surface of the support plate portion 16 of the trunnion 15 and an outer surface of the outer ring 28. Such thrust needle bearing 25 allows the swinging of the power roller 11 and the outer ring 28 about the base end portion 23a of each displacement shaft 23 while bearing a thrust load applied to each outer ring 28 from the power roller 11.

Further, drive rods (trunnion shafts) 29, 29 are respectively provided at one end portions lower end portions in FIG. 4) of respective trunnions 15, 15. Drive pistons (hydraulic pistons) 33, 33 are fixedly arranged at outer peripheral surfaces of intermediate portions of respective drive rods 29, 29. Then, each of the drive pistons 33, 33 is respectively fitted in an oil-tight manner into the drive cylinder 31 configured by an upper cylinder body 61 and a lower cylinder body 62. Respective drive pistons 33, 33 and the drive cylinder 31 constitute a drive device 32 for displacing respective trunnions 15, 15 in an axial direction of the pivot shafts 14, 14 of the trunnions 15, 15.

In the case of the toroidal continuously variable transmission configured in this way, the rotation of the input shaft 1 is transmitted to respective input-side disks 2, 2 via the pressing device 12. Then, the rotation of these input-side disks 2, 2 is transmitted to respective output-side disks 3, 3 via a pair of power rollers 11, 11. Then, the rotation of respective output-side disks 3, 3 is taken out from the output gear 4.

When a rotational speed ratio between the input shaft 1 and the output gear 4 is changed, the pair of drive pistons 33, 33 is displaced in opposite directions to each other. In conjunction with the displacement of the respective drive pistons 33, 33, the pair of trunnions 15, 15 is displaced in opposite directions to each other. For example, the power roller 11 located on the left side in FIG. 4 is displaced downwardly in FIG. 4 while the power roller 11 located on the right side in FIG. 4 is displaced upwardly in FIG. 4.

As a result, a direction of a tangential force applied to abutment portions between the peripheral surfaces 11a, 11a of the respective power rollers 11, 11 and the inner surfaces 2a, 2a, 3a, 3a of the respective input-side disks 2, 2 and the respective output-side disks 3, 3 is changed. Then, in conjunction with the change in the direction of the force, the respective trunnions 15, 15 are swung (tilted) n opposite directions to each other about the pivot shafts 14, 14 pivotally supported on the yokes 23A, 23B.

As a result, the abutment positions between the peripheral surfaces 11a, 11a of the respective power rollers 11, 11 and the respective inner surfaces 2a, 3a are changed, so that the rotational speed ratio between the input shaft 1 and the output gear 4 is changed. Further, when a torque transmitted between the input shaft 1 and the output shaft 4 is changed and the elastic deformation amount of respective constituent members is thus varied, the respective power rollers 11, 11 and the outer rings 28, 28 attached to the respective power rollers 11, 11 are slightly pivoted about the base end portions 23a, 23a of respective displacement shafts 23, 23. Since the thrust needle bearings 25, 25 are respectively placed between the outer surfaces of respective outer rings 28, 28 and the inner surfaces of the support plate portions 16 constituting respective trunnions 15, 15, the pivoting is smoothly performed. Accordingly, a force for changing the inclination angles of respective displacement shafts 23, 23 as described above may be small.

By the way, in the double cavity-type toroidal continuously variable transmission, as shown in FIG. 5, an integrated output-side disk 34 has been used in which the pair of output-side disks 3, 3 is integrated in the state where the rear surfaces of the pair of output-side disks 3, 3 arranged between the pair of input-side disks 2, 2 are joined to each other, and the output gear is formed by providing outer peripheral teeth 41 on outer peripheral surfaces of the output-side disks 3, 3 integrated in this manner (e.g., see Patent Document 1).

Since the integrated output-side disk 34 is supported on the input shaft 1 via a radial needle bearing 35, the input shaft 1 is subjected, via the radial needle bearing 35, to a gear reaction force (radial force) applied to the outer peripheral teeth 41 of the integrated output-side disk 34.

Under the condition that a torque passing through the output-side disk (integrated output-side disk) is large, a large bending force is applied to the input shaft 1 by a large axial force and gear load.

Accordingly, as shown in FIG. 6, in order to prevent the input shaft 1 from being subjected to the gear reaction force, the input shaft 1 is inserted through a cylindrical hollow shaft 71 and the integrated output-side disk 34 is rotatably supported on the hollow shaft 71 via the radial needle bearing 35.

Both ends of the hollow shaft 71 are supported on a pair of columnar posts 69 which is integrally formed by, for example, connecting the pair of upper and lower spherical posts 64, 68 described above. Lower end portions of the columnar posts 69 are fixedly supported on the cylinder body 31 and upper end portions of the columnar posts 69 are fixed to the fixing members 52. Then, the cylinder body 31 and the fixing members 52 are fixed to the casing.

Further, the input shaft 1 extends through the central portion of the columnar post 69. The integrated output-side disk 34 is disposed between the pair of columnar posts 69, 69 and a thrust bearing 67 is disposed between each columnar post 69 and the integrated output-side disk 34, so that the position along the axial direction of the integrated output-side disk 34 is restricted.

The radial needle bearings 35 are disposed between an inner peripheral surface of a central through-hole of the integrated output-side disk 34 and an outer peripheral surface of the hollow shaft 71. The radial needle bearings 35 are spaced apart from each other at two positions which correspond to both ends along the axial direction of the integrated output-side disk 34.

CITATION LIST

Patent Documents

Patent Document 1: Japanese Patent Publication No. 2001-116067

SUMMARY

Problems to be Solved

By the way, in the conventional toroidal continuously variable transmission shown in FIG. 6, the input shaft 1 is supported on a casing (not shown) via a bearing (not shown) provided at its axial end. Further, the hollow shaft 71 is supported on the casing via the columnar post 69, the cylinder body 31 and the fixing member 52 or the like.

Therefore, in the case where the machining precision of the casing is poor, an axis of the input shaft 1 and an axis of the hollow shaft 71 are often misaligned. In this case, the input-side disk 2 supported on the input shaft 1 and the integrated output-side disk 34 supported on the hollow shaft 71 are misaligned.

When the misalignment occurs in the input-side disk 2 and the integrated output-side disk 34 as described above, the load carried by the power roller 11 becomes unbalanced and the risk of gross slip is thus increased.

In order to suppress the misalignment between the input-side disk 2 and the integrated output-side disk 34, it is required to increase the machining precision of the casing, the portion of the casing to which a bearing provided at an axial end of the input shaft 1 is attached, the columnar post 69 to support the hollow shaft 71, the cylinder body 31 and the fixing member 52 or the like. This leads to an increase in cost.

Further, since it is required to support the axial end of the input shaft 1 by a bearing, the length of the input shaft 1 is accordingly increased. As a result, the length of the toroidal continuously variable transmission itself is also increased.

Further, the lubrication of the bearing 35 between the hollow shaft 71 and the integrated output-side disk 34 is carried out by supplying lubricating oil to a gap between the hollow shaft 71 and the input shaft 1 through an oil hole 1B from an oil passage 1A formed in the input shaft 1 and supplying the lubricating oil to the bearing 35 through an oil hole 1C provided in the hollow shaft 71.

On the other hand, the gap between the hollow shaft 71 and the input shaft 1 is required to have a predetermined diametrical dimension in order to avoid the interference therebetween.

Accordingly, there is a possibility that the lubricating oil is leaked from a diametrical gap between an end portion of the hollow shaft 71 and the input shaft 1. In this case, there is a possibility that the bearing 35 between the hollow shaft 71 and the integrated output-side disk 34 is seized.

The present invention has been made in view of the above situations and an object thereof is to provide a toroidal continuously variable transmission which is capable of suppressing misalignment of both disks (input-side disk and output-side disk) without increasing the machining precision of a casing or other members, achieving compactness and preventing the seizing of a bearing between a hollow shaft and a disk.

Means for Solving the Problems

In order to achieve the above object, a toroidal continuously variable transmission of the present invention includes:
  a pair of disks which is provided rotatably and concentrically with each other in a state where inner surfaces of respective disks are opposed to each other; and
  a power roller held between the disks opposing to each other,
  wherein one of the disks is supported on a shaft,
  wherein the other of the disks is rotatably supported, via a first bearing, on a hollow shaft into which the shaft is inserted and which is non-rotatably supported by a support member, and
  wherein the shaft is rotatably supported on the hollow shaft via a second bearing.

In the above configurations of the present invention, it is preferable that a restriction portion for restricting the axial movement of the second bearing is provided in at least one of an outer peripheral surface of the shaft and an inner peripheral surface of the hollow shaft.

Further, in the above configurations of the present invention, it is preferable that the support member is supported on a base fixed to a casing.

Effects of the Invention

According to the present invention, the hollow shaft is non-rotatably supported by the support member, the shaft on which one of the disks is supported is rotatably supported on the hollow shaft via the second bearing, and the other of the disks is rotatably supported on the hollow shaft via the first bearing. Thus, the misalignment between the input-side disk and the output-side disk can be suppressed without increasing the machining precision of the casing or other members, compactness can be achieved and the seizing of the bearing between the hollow shaft and the output-side disk can be prevented.

DETAILED DESCRIPTION

Hereinafter, an embodiment of the present invention will be described with reference to the drawings.

Figure 1:
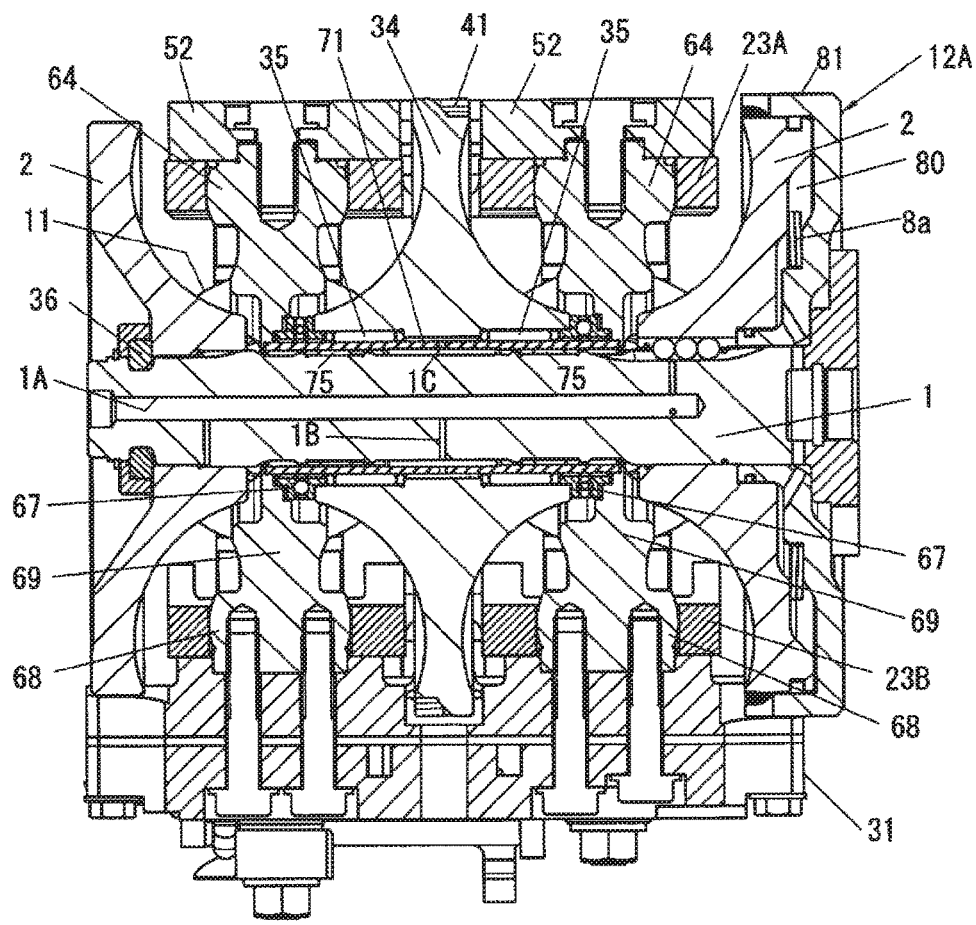
FIG. 1 is a sectional view showing a toroidal continuously variable transmission according to an embodiment of the present invention.

As shown in FIG. 1, this embodiment is an example of a case where the present invention is applied to a double cavity-type half-toroidal continuously variable transmission.

Figure 6:
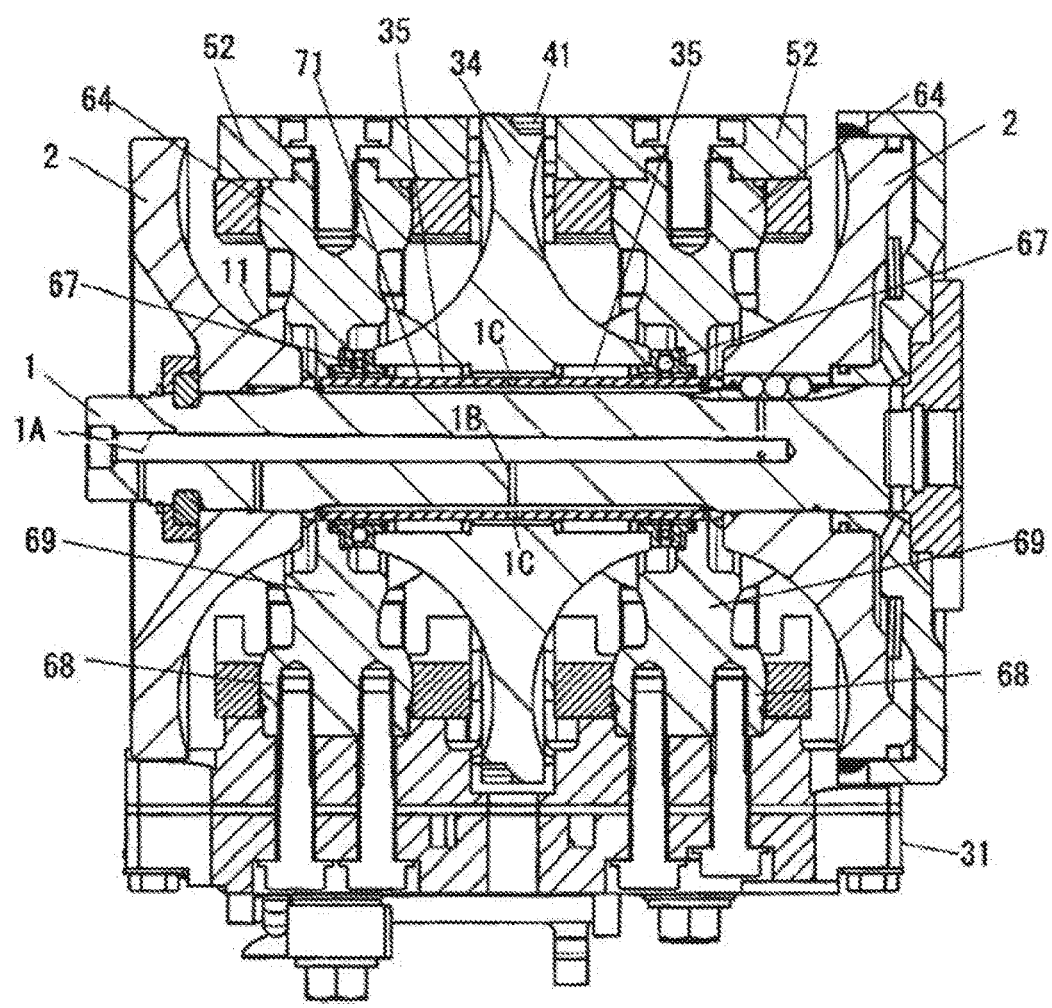
FIG. 6 is a sectional view showing another example of a conventional toroidal continuously variable transmission which includes an integrated output-side disk.

Meanwhile, a main feature of the toroidal continuously variable transmission of the present embodiment is that an input shaft (the shaft) 1 is rotatably supported on a hollow shaft 71 via second bearings 75, that the hollow shaft 71 is non-rotatably supported by columnar posts (the support members) 69, and that the input shaft 1 is shorter than a conventional input shaft. Other configurations are substantially the same as those of the toroidal continuously variable transmission shown in FIG. 6, and hence, the above features are described in detail below.

Upper and lower spherical posts 64, 68 for supporting a pair of yokes 23A, 23B constitute the integrated columnar post (the support member) 69 connected above and below. The spherical posts 64, 68 are arranged at upper and lower end portions of the columnar post 69, respectively. The input shaft 1 extends through a central portion of the columnar post 69. Further, a pair of columnar posts 69 is laterally spaced apart from each other in FIG. 1 so as to hold the integrated output-side disk 34 therebetween. Thrust ball bearings 60 are disposed between the integrated output-side disk 34 and the columnar posts 69. In this way, the position of the integrated output-side disk 34 in the axial direction of the input shaft 1 is restricted by the pair of columnar posts 69. Further, the integrated output-side disk 34 is rotatably supported by the thrust ball bearings 60, 60 and radial needle bearings (the first bearings) 35, 35 disposed between the hollow shaft 71 and the integrated output-side disk 34.

The lower end portions of the columnar posts 69 are fixedly supported on the cylinder body (base) 31 and the upper end portions of the columnar posts 69 are fixed to the fixing members 52. Then, when the cylinder body 31 and the fixing members 52 are fixed to a casing (not shown), the columnar posts 69 are supported on the casing via the cylinder body 31 and the fixing members 52.

The hollow shaft 71 is disposed between the pair of columnar posts 69, 69 fixed in this manner and both end portions of the hollow shaft 71 are respectively fixed to the columnar posts 69, 69, so that the hollow shaft 71 is supported in a non-rotatable manner.

Specifically, as shown in MEL 2, a cylindrical inner peripheral surface 69a and a flange portion 69b are provided at a substantially central portion in the vertical direction of the columnar post 69. The cylindrical inner peripheral surface 69a is coaxial with the input shaft 1 on the outside of the input shaft 1. The flange portion 69b protrudes radially inward from the cylindrical inner peripheral surface 69a. Then, an end outer peripheral surface and an end surface of the hollow shaft 71 are respectively fitted to the cylindrical inner peripheral surface 69a and the flange portion 69b, so that both end portions of the hollow shaft 71 are fixedly supported on the columnar posts 69, 69, respectively.

Further, as described above, the radial needle bearings (the first bearings) 35, 35 are provided between the hollow shaft 71 and the integrated output-side disk 34. That is, large-diameter portions 34a are provided at both axial end portions of the inner diameter surface of the integrated output-side disk 34, and the radial needle bearings (the first bearings) 35, 35 are provided between the outer peripheral surface of the hollow shaft 71 and the inner peripheral surfaces of the large diameter portions 34a.

Further, as shown in FIG. 1, the input shaft (the shaft) is inserted into the hollow shaft 71 and the input-side disks 2, 2 are respectively supported on both end portions of the input shaft 1, A cotter 36 fixed to the input shaft 1 is abutted against the rear surface side of the input-side disk 2 located on the left side (on the side far from a pressing device 12A) in FIG. 1. When a pulling force directed from the hydraulic pressing device 12A to the input shaft 1 is applied on the pressing device 12A, this force is transmitted to the left input-side disk 2 from the input shaft 1 via the cotter 36. Therefore, this input-side disk 2 is in a state of being pressed against the integrated output-side disk 34 through the power roller 11.

Further, the input-side disk 2 located on the right side (on the side close to the pressing device 12A) is coupled to the input shaft 1 by a pawl-spline coupling. The input-side disk 2 is allowed to move in the axial direction and rotated together with the input shaft 1. Meanwhile, this input-side disk 2 is moved by being pressed toward the integrated output-side disk 34 by the pressing device 12A.

The pressing device 12A includes a cylinder 81 rotating together with the input shaft 1, and a hydraulic chamber 80 is formed between the rear surface of the input-side disk 2 and the cylinder 81. The outer peripheral surface of the input-side disk 2 located on the right side is in sliding contact with an inner peripheral surface of the cylinder 81. A disc spring 8a having the same function as the disc spring 8 described above is provided in the hydraulic chamber 80.

Further, the input-side disk 2 is moved by being pressed toward the integrated output-side disk 34 by the hydraulic pressure introduced into the hydraulic chamber 80. Then, this input-side disk 2 is in a state of being pressed against the integrated output-side disk 34 through the power roller 11. Therefore, the hydraulic pressing device 12A presses the pair of input-side disks 2, 2 toward the integrated output-side disk 34 arranged therebetween.

Figure 2:
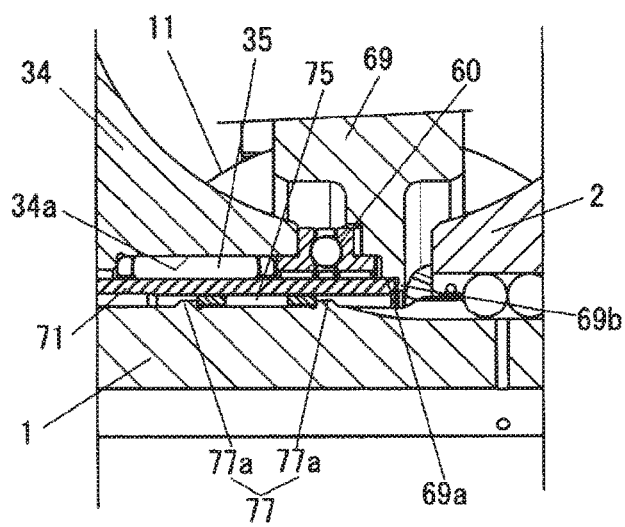
FIG. 2 is a sectional view of a main part showing a hollow shaft and its vicinity in FIG. 1.
Figure 3:
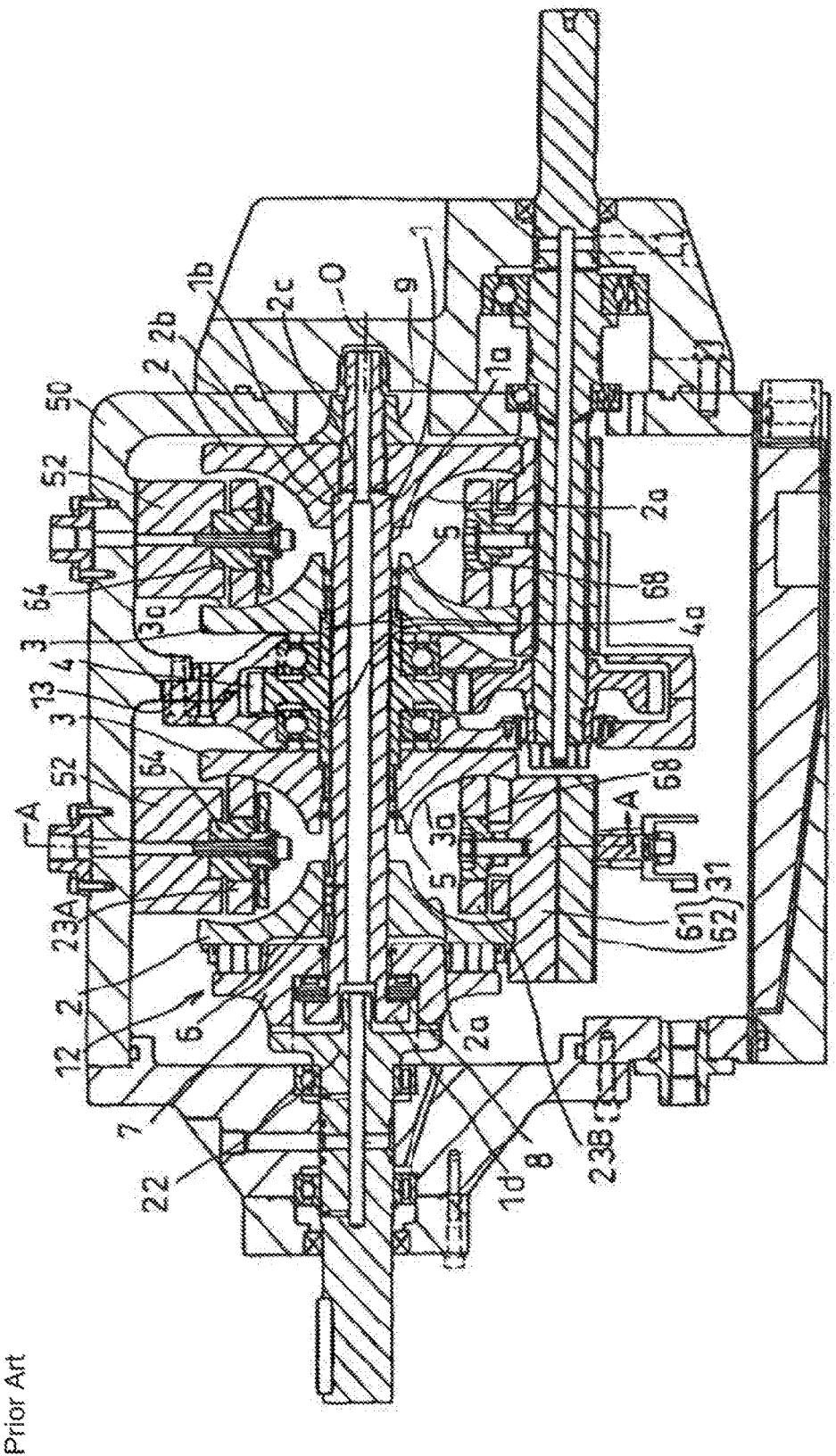
FIG. 3 is a sectional view showing an example of a conventional toroidal continuously variable transmission.
Figure 4:
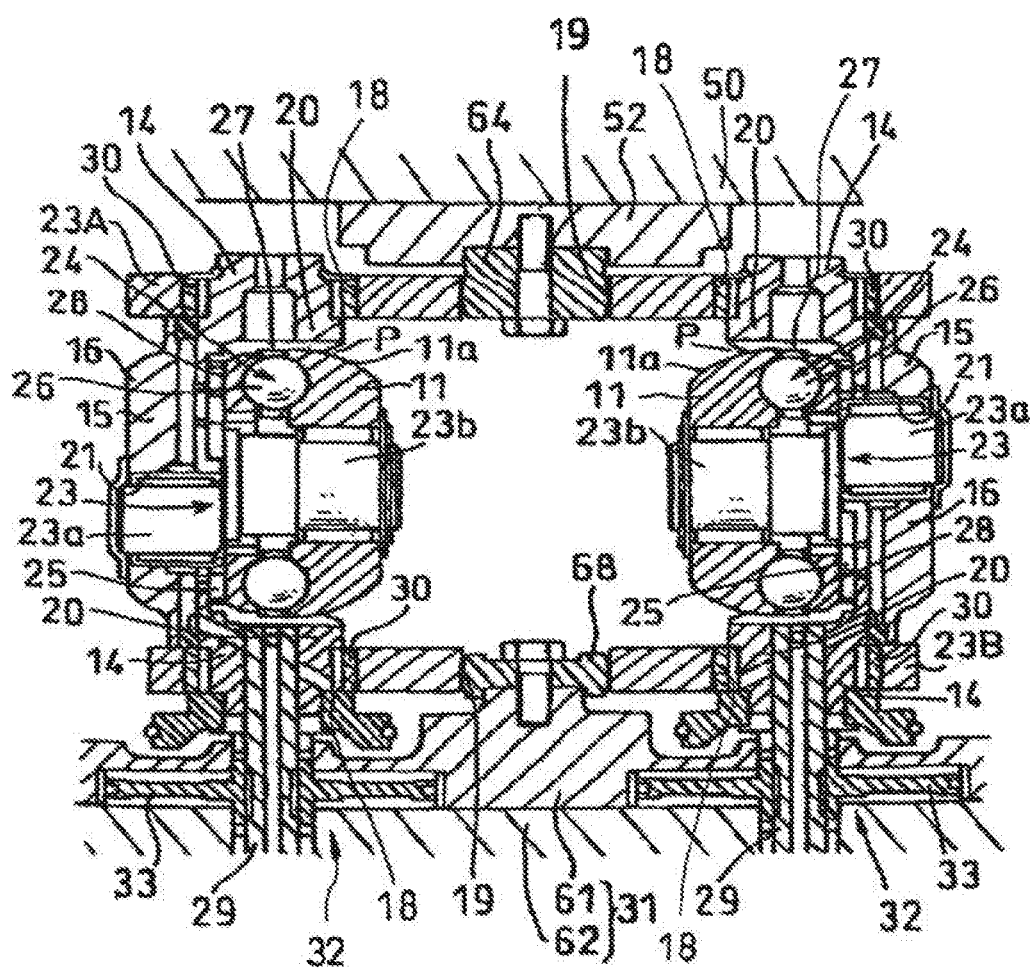
FIG. 4 is a sectional view taken along a line A-A shown in FIG. 3.
Figure 5:
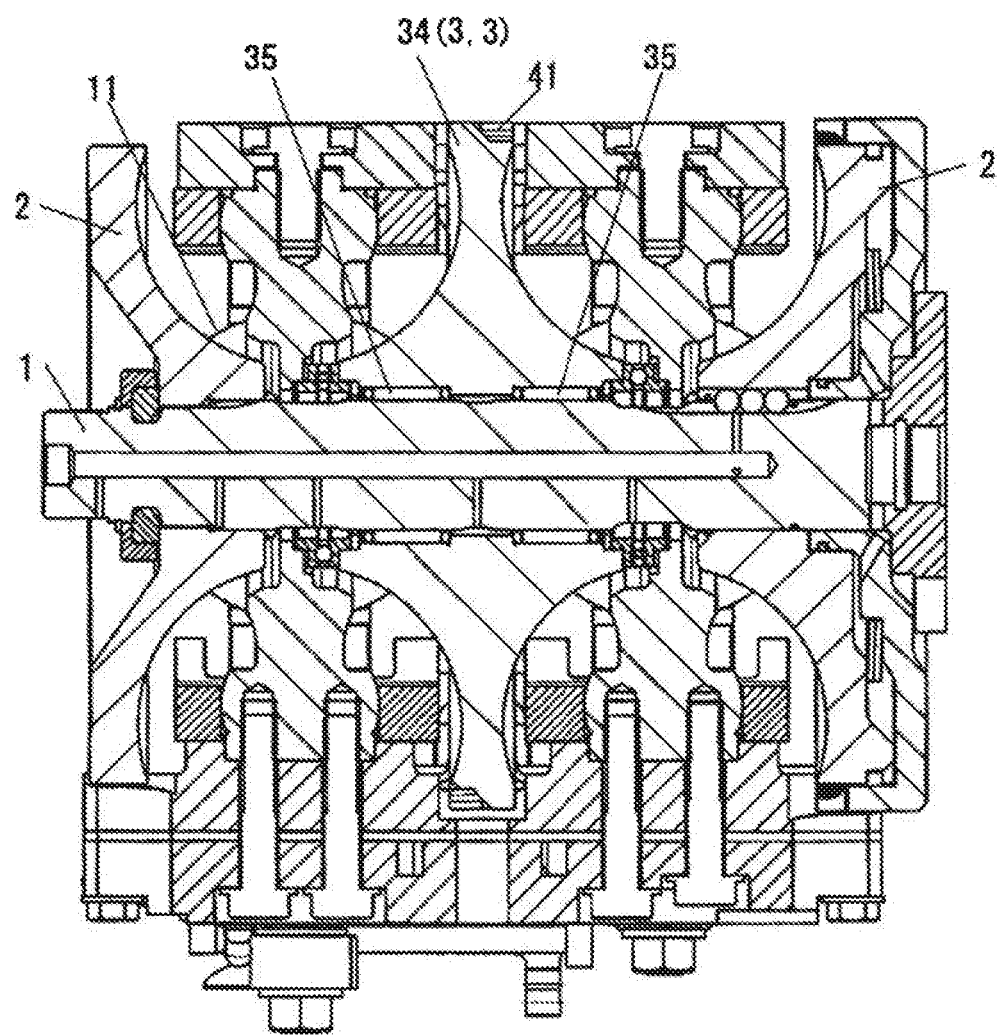
FIG. 5 is a sectional view showing an example of a conventional toroidal continuously variable transmission which includes an integrated output-side disk.

Further, as shown in FIG. 2, the second bearings 75 are provided between the hollow shaft 71 and the input shaft 1, and hence, the input shaft 1 is rotatably supported on the hollow shaft 71 via the second bearings 75. The second bearing 75 is composed of a rolling or sliding bearing. The second bearing 75 is respectively arranged on both end sides of the hollow shaft 71 and the axial movement of the second bearing 75 is restricted by the restricting portion 77.

The restricting portion 77 is configured by a pair of convex portions 77a, 77a provided at the outer peripheral surface of the input shaft 1 facing both end portions of the hollow shaft 71 in the radial direction. The convex portions 77a, 77a are spaced apart from each other in the axial direction and are provided continuously or at a predetermined interval in the circumferential direction. Furthermore, a predetermined gap is provided between the convex portions 77a, 77a and the inner peripheral surface of the hollow shaft 71.

Then, the second bearings 75 are provided between the convex portions 77a, 77a and at the outer peripheral surface of the input shaft 1. The axial movement of the second bearings 75 is restricted by the convex portions 77a, 77a. Meanwhile, the restricting portion 77 may be provided at the inner peripheral surface of the hollow shaft 71 or may be provided at both the outer peripheral surface of the input shaft 1 and the inner peripheral surface of the hollow shaft 71.

The second bearing 75 may have a ring shape or may have a two-split type. In the case of the two-split type bearing, it is not necessary to thin the input shaft 1, and hence, a decrease in strength can be accordingly prevented.

In this way, the input shaft 1 is supported b the hollow shaft 71 via the second bearings 75. Further, the input-side disks 2, 2 are supported by the input shaft 1. Therefore, the input-side disks 2, 2 are supported by the hollow shaft 71 via the input shaft 1 and the second bearings 75.

On the other hand, the integrated output-side disk 34 is supported by the hollow shaft 71 via the first bearings 35.

Therefore, the input-side disks 2, 2 and the integrated output-side disk 34 are supported by the hollow shaft 71. Further, the hollow shaft 71 is supported by the columnar posts (support members) 69, as described above.

Furthermore, since the input shaft 1 is supported by the hollow shaft 71 via the second bearings 75, it is not necessary to provide a bearing at an axial end of the input shaft 1 as in the prior art, and thus, the length of the input shaft can be accordingly shortened, as compared to the conventional input shaft.

Further, the oil passage 1A extending in the axial direction is provided in the input shaft 1 and the oil passage 1B for supplying the lubricating oil between the outer peripheral surface of the input shaft 1 and the inner peripheral surface of the hollow shaft 71 is provided perpendicular to the axial direction of the input shaft 1. Then, the lubricating oil supplied between the outer peripheral surface of the input shaft 1 and the inner peripheral surface of the hollow shaft 71 is supplied to the second bearings 75.

Further, the oil passage 1C penetrating from the inner peripheral surface to the outer peripheral surface of the hollow shaft 71 is provided at a substantially central portion in the axial direction of the hollow shaft 71. Then, the lubricating oil supplied between the outer peripheral surface of the input shaft 1 and the inner peripheral surface of the hollow shaft 71 is supplied to the outer peripheral surface of the hollow shaft 71 and the inner peripheral surface of the integrated output-side disk 34 through the oil passage 1C. The lubricating oil supplied in this manner is supplied to the first bearings 35.

In the toroidal continuously variable transmission configured in this manner, the hollow shaft 71 is supported by the columnar post 69, the input shaft 1 on which the input-side disks 2 are supported is rotatably supported on the hollow shaft 71 via the second bearings 75, and the integrated output-side disk 34 is rotatably supported on the hollow shaft 71 via the first bearings 35. Therefore, misalignment between both disks 2, 34 can be easily and securely suppressed by the hollow shaft 71, the first bearings 35 and the second bearings 75 without requiring the bearing to support the end portion of the input shaft as in the prior art.

Further, since the lower end portions of the columnar posts 69 are fixedly supported on the cylinder body (base) 31 and the upper end portions of the columnar posts 69 are fixed to the fixing members 52, the columnar posts 69 are in a state of being independently fixed even without the casing. Since the hollow shaft 71 is fixedly supported on the columnar posts 69, the positioning (positioning of the axes) between the input-side disks 2 and the integrated output-side disk 34 supported on the hollow shaft 71 can be completed within a variator module (an assembly composed of the input shaft 1, the input-side disks 2, the integrated output-side disk 34, the power rollers 11, the yokes 23A, 23B, the columnar posts 69, and the cylinder body (base) 31, etc.).

Therefore, even when the machining precision of the casing is relatively poor, the misalignment between both disks 2, 34 can be suppressed, regardless of the machining precision. As a result, the load carried by the power roller becomes balanced and the gross slip can be thus avoided.

Further, since the positioning (positioning of the axes) between the input-side disk 2 and the integrated output-side disk 34 can be carried out by the columnar post 69, the hollow shaft 71, the first bearing 35 and the second bearing 75, it is not required to increase the machining precision of the casing or other members. As a result, cost reduction can be achieved.

Further, since the restricting portion 77 having the convex portions 77a, 77a is provided at the outer peripheral surface of the input shaft 1 facing both end portions of the hollow shaft 71 in the radial direction, the convex portions 77a, 77a of the restricting portion 77 can restrict the axial movement of the second bearing 75 without using other components or the like. Therefore, cost reduction can be achieved also in this regard.

Further, since the input shaft 1 is rotatably supported on the hollow shaft 71 via the second bearings 75, the gap between the input shaft 1 and the hollow shaft 71 can be set to a minimum gap required to provide the second bearings 75. Therefore, the diametrical gap between the end portion of the hollow shaft 71 and the input shaft becomes extremely small, thereby preventing the lubricating oil from being leaked from the gap. In this way, the lubricating oil can be supplied to the first bearings 35 provided between the hollow shaft 71 and the integrated output-side disk 34 from the oil hole 1C provided in the hollow shaft 71, so that the first bearings 35 can be effectively lubricated. As a result, it is possible to prevent the seizing of the first bearings 35.

In addition, since it is not required to provide a bearing which is conventionally provided at the axial end of the input shaft 1, the length of the input shaft 1 is accordingly shortened. As a result, the compactness of the toroidal continuously variable transmission can be achieved.

Meanwhile, in the present embodiment, an example where the integrated output-side disk 34 is supported by the hollow shaft 71 has been described. However, in the toroidal continuously variable transmission, the input-output relationship between the input-side disk and the output-side disk may be reversed. Therefore, the present invention may be applied to a case where the input-side disks are supported by the hollow shaft.

Further, in the present embodiment, an example where the present invention is applied to a double cavity-type half-toroidal continuously variable transmission has been described. However, the present invention is not limited to this configuration but may be applied to a single cavity-type half-toroidal continuously variable transmission or a full toroidal continuously variable transmission.

This application is based upon Japanese Patent Application No. 2014-27123 filed on Feb. 17, 2014 and the contents of which are incorporated herein by reference.

REFERENCE NUMERALS LIST

2: Input-side Disk (Disk), 11: Power Roller, 31: Cylinder Body (Base), 34: Integrated Output-side Disk (Disk), 35: First Bearing, 69: Columnar Post (Support Member), 71: Hollow Shaft, 77: Second Bearing, 77: Restricting Portion

The invention claimed is:

1. A double cavity-type toroidal continuously variable transmission comprising:
   a pair input-side disks and an integrated output-side disk which are provided rotatably and concentrically with each other in a state where inner surfaces of the input-side disks respectively opposing inner surfaces of the integrated output-side disk; and
   a pair of power rollers respectively held between the input-side disks and the integrated output side disk,
   wherein the input-side disks are supported non-rotatably on an input shaft,
   wherein the output-side disk is rotatably supported, via a first bearing, on a hollow shaft, the input shaft is inserted into the hollow shaft, and the input shaft is rotatably supported on the hollow shaft via a second bearing,
   wherein the output-side disc is an integrated output-side disk, including a pair of output-side disks integrated in a state where rear surfaces of the pair of output-side disks arranged between the pair of input-side disks are joined to each other, and an output gear is formed by providing outer peripheral teeth on an outer peripheral surface of the integrated output-side disk,
   wherein the hollow shaft is non-rotatably supported by a support member, and
   wherein the first bearing and the second bearing are arranged such that their extension in an axial direction is overlapping.

2. The toroidal continuously variable transmission according to claim 1,
   wherein a restriction portion for restricting the axial movement of the second bearing is provided in at least one of an outer peripheral surface of the input shaft and an inner peripheral surface of the hollow shaft.

3. The toroidal continuously variable transmission according to claim 1,
wherein the support member is supported on a base fixed to a casing.

\* \* \* \* \*